United States Patent [19]

Ito

[11] Patent Number: 5,514,061
[45] Date of Patent: May 7, 1996

[54] MACHINE TOOL FOR WORKING REAR SURFACE OF WORKPIECE

[75] Inventor: Masamichi Ito, Aichi, Japan

[73] Assignee: Okuma Corporation, Japan

[21] Appl. No.: 278,869

[22] Filed: Jul. 22, 1994

[30] Foreign Application Priority Data

Jul. 26, 1993 [JP] Japan .................................. 5-204709

[51] Int. Cl.⁶ ........................... B23Q 3/155; B23B 15/00
[52] U.S. Cl. ............................ 483/18; 483/30; 29/26 A; 29/27 C; 82/124
[58] Field of Search ........................... 29/26 A, 27 C, 29/36, 38 B; 82/124, 142, 145; 269/57, 58; 483/30, 36, 38, 18, 22

[56] References Cited

U.S. PATENT DOCUMENTS 5,401,230  3/1995  Momoi et al. ...................... 29/27 C X

FOREIGN PATENT DOCUMENTS 2215251  9/1989  United Kingdom .................. 29/27 C

OTHER PUBLICATIONS

Japanese Utility—Model Application, Laid–Open Publication No. Sho 52–33674, Application No. Sho 47–69171, Application Date: Jun. 12, 1972, Applicant: Okuma Corporation.

Japanese Utility—Model Application, Laid–Open Publication No. Hei 2–47103, Application No. Sho 63–126866 Application Date: Sep. 28, 1988, Applicant: Okuma Corporation.

Japanese Utility—Model Application, Laid–Open Publication No. Sho 55–107939, Application Date: Jan. 20, 1979.

*Primary Examiner*—S. Thomas Hughes
*Attorney, Agent, or Firm*—Dickstein, Shapiro & Morin

[57] ABSTRACT

A machine tool for continuously working the surface and the back of a workpiece, comprising a chuck base which is supported so that it is able to approach to or move away from the workpiece, on which a tool spindle for holding a cutting tool and a chuck for holding the workpiece are mounted, and which is able to rotate about the rotation axis perpendicular to the tool-spindle moving direction and a reversing mechanism which is arranged at the front in the direction perpendicular to the spindle moving direction and the chuck-base rotation axis, receives a workpiece, reverses the workpiece, returns the reversed workpiece to the chuck, and changes the portions of the workpiece facing a cutting tool.

5 Claims, 5 Drawing Sheets

MACHINE TOOL FOR WORKING REAR SURFACE OF WORKPIECE

BACKGROUND OF THE INVENTION

1. Field of the Invention

The present invention relates to a machine tool, particularly to a machine tool making it possible to continuously work the back of a workpiece held by a chuck, which cannot be reached by a cutting tool, by changing the workpiece holding positions.

2. Description of the Prior Art

FIG. 1 shows an existing machine tool capable of working the back of a workpiece. A first chuck 12 for holding a workpiece 14 is set on a first chuck base 10 secured to a machine table not shown. A first tool spindle 18 holding a first cutting tool 16 for working the workpiece 14 is arranged at a position facing the workpiece 14. The first tool spindle 18 is secured onto a turret 20. The turret 20 is rotatably supported by a tool headstock 22. Moreover, it is possible to change a position where the first cutting tool 16 contacts the workpiece 14 by changing the spindle direction A of the headstock 22 and the lateral direction B perpendicular to the direction A. Thereby, it Is possible to work a desired position of a surface portion 14a of the workpiece 14 facing the first cutting tool 16. This type of working is known as front surface working. During front surface working, a rear surface portion 14b of the workpiece 14 facing the chuck 12 cannot be worked because a tool cannot enter or reach the portion 14b.

To work the rear surface portion 14b, a second chuck base 24 and a second chuck 26 are used. The second chuck base 24 is set at a position facing the first chuck base 10 and moreover, arranged so that it is able to move in the direction C of the first chuck base 10. When front surface working is completed, the tool headstock 22 temporarily moves backward and the second chuck base 24 moves toward the first chuck base 10. Then, the second chuck base 24 holds the front surface portion 14a of the workpiece 14 with the second chuck 26 and then moves backward. The front surface and the rear surface of a workpiece 14 usually have different shapes. For this reason, the first chuck has jaws which fit the rear surface of the workpiece, while the second chuck has jaws which fit the front surface of the workpiece.

The turret 20 is provided with not only the first tool spindle 18 but also a second tool spindle 28 and a second cutting tool 30 through an attachment 32. The second cutting tool 30 is turned by 180° from the first cutting tool 16 by the attachment 32. This makes it possible to work the workpiece 14 held by the second chuck 26. The portion of the workpiece held by the second chuck 26 and facing the second cutting tool is the rear surface portion 14b and therefore, the portion 14b can be worked. Working of the portion 14b is called back working.

As described above, because the existing machine tool allows continuous surface working and back working, a positional deviation, which occurs when a workpiece is removed from a chuck and reversed and secured to the chuck again, is decreased. Particularly, it is possible to decrease a positional deviation in the rotational direction.

However, there is a problem that two chucks are used for one tool headstock and thereby the size of the machine tool increases. Moreover, there is a problem that, an exclusive tool is required for front surface working and rear surface working respectively but the number of tools is restricted and therefore only simple working can be carried out.

SUMMARY OF THE INVENTION

To achieve the above object, a machine tool of the present invention continuously works tile front and the rear surface of a workpiece, comprising a tool spindle which is supported accessibly to the workpiece and holds a cutting tool, a chuck base on which first and second chucks for holding the workpiece are mounted concentrically and back to back and which is rotatable about a rotation axis perpendicular to the moving direction of the tool spindle, and a reversing mechanism which is arranged at the front in the lateral direction perpendicular to the moving direction of the tool spindle and the rotation axis of the chuck, receives a workpiece held by a first chuck, reverses the workpiece, returns the reversed workpiece to a second chuck having a shape fitted to the shape of a worked portion, and changes the portions of the workpiece facing the cutting tool.

Moreover, the chuck base is slidable in the lateral direction. When the workpiece is delivered, the chuck base moves backward in the lateral direction to efficiently deliver the workpiece.

Furthermore, the reversing mechanism comprises a hand for holding a workpiece in the lateral direction, an arm having a rotation axis rotating in the direction perpendicular to the lateral direction, and a rotary actuator for rotating the arm about the rotation axis and reversing the workpiece held by the hand. The hand holds or releases the workpiece held by the chuck. The rotary actuator reverses the hand to reverse the workpiece. Then, the chuck holds the workpiece again. In this case, because the workpiece is held by being reversed, a portion which could not be worked before delivery is placed at a position facing the tool.

Moreover, a machine tool of the present invention includes a tool magazine for holding various types of cutting tools and a tool replacing mechanism for replacing a cutting tool held by the spindle with a cutting tool held by the tool magazine. Thus, a tool corresponding to a working shape is selected and working is performed. Particularly, because the direction of a tool is the same for front surface working and rear surface working, it is not necessary to independently hold a tool for front surface working and a tool for rear surface working.

The above constitution makes it possible to continuously work the front and the rear surface of a workpiece. In this case, because the workpiece holding position is not changed, it is possible to decrease a positional deviation due to the change of workpiece holding positions. Moreover, because the tool for working the front and rear surface can be used in common, it is possible to prepare various types of tools and perform various types of working with the same machine tool. Furthermore, it is possible to stably hold a workpiece even if the area of the holding portion of the workpiece for front surface working and rear surface working increases because a chuck dedicated to surface working and a chuck dedicated to back working are independently used.

DESCRIPTION OF THE PREFERRED EMBODIMENTS

Preferred embodiments of the present invention will be described below with reference to the accompanying drawings.

Figure 1:
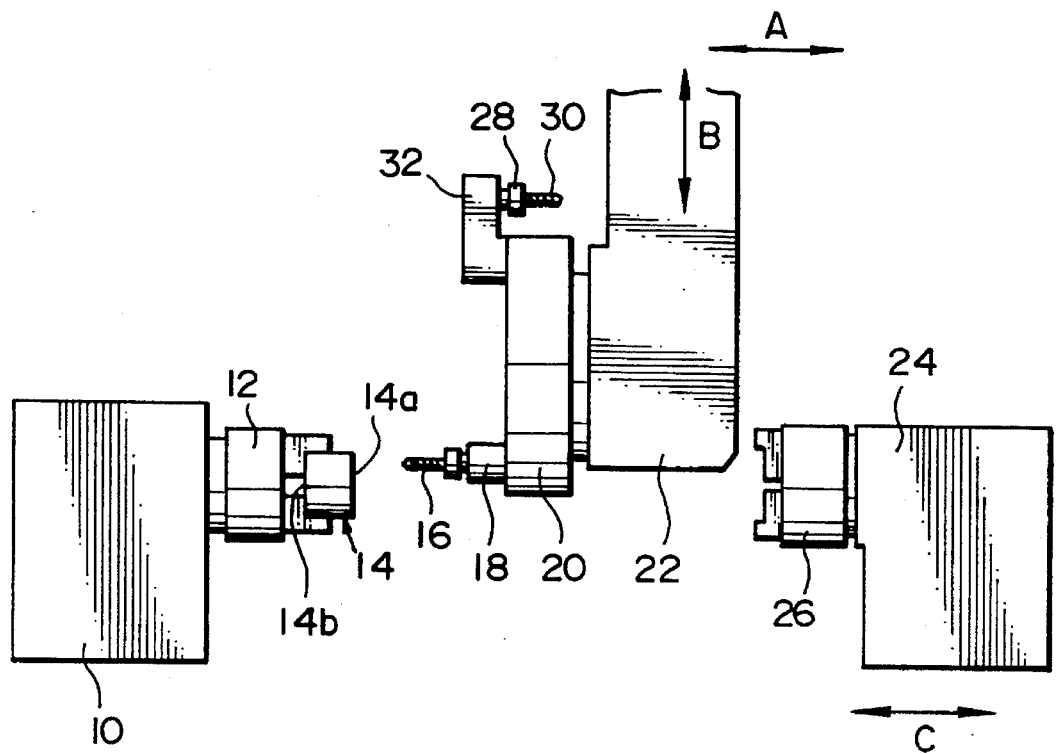
FIG. 1 is an existing machine tool making it possible to continuously work the front and the rear surface of a workpiece.
Figure 2:
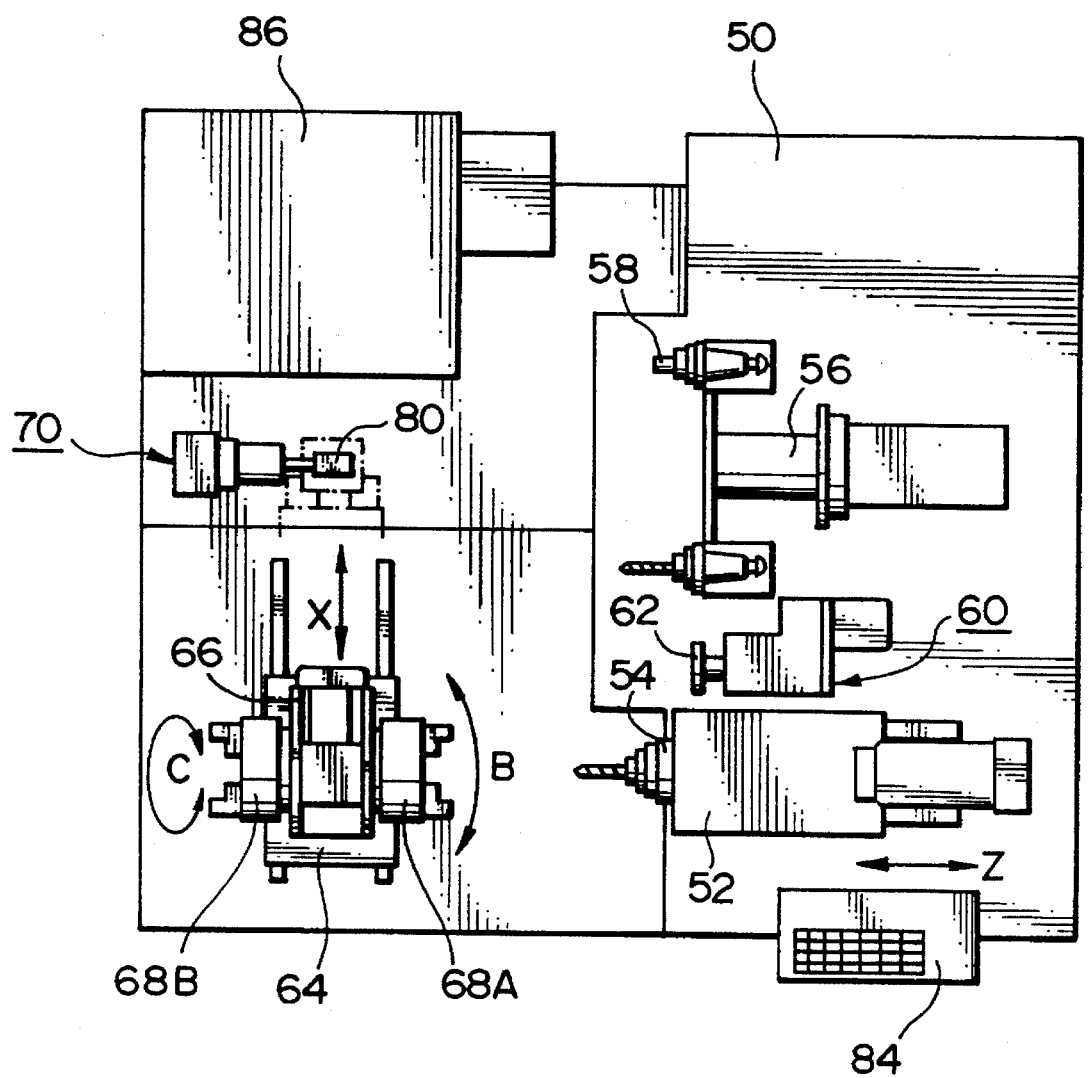
FIG. 2 is a top view showing the constitution of a preferred embodiment of the present invention.

FIG. 2 is a top view showing the constitution of the machine tool of a first embodiment of the present invention. A tool spindle head 52 is mounted on the machine tool 50 set on a floor so that it is positioned in the Z-axis direction. A spindle 54 is rotatably supported by the tool spindle 52. A tool magazine 56 is set at a position next to the tool spindle 52. The tool magazine 56 has a structure known to the public in which a plurality of tools 58 are stored in the same direction as a spindle 54 and a designated tool is indexed at the replacing position of the headstock side. A tool replacing unit 60 is set at the middle between the tool spindle head 52 and the tool magazine 56 and a twin-arm tool replacing arm 62 is set to the tool replacing unit 60 so that it can be rotated by 90° and 180° and removed in the rotation axis direction.

Moreover, a chuck base 64 is set at a position facing the spindle on the machine tool 50 so that it can be positioned in the X-axis direction. Furthermore, the chuck base 64 can be rotated by 90° and 180° and indexed on the X-Z plane (B-axis rotation). Furthermore, a circular table 66 which can be rotated and indexed on the X-Y plane (C-axis rotation indexing) is set on the chuck base 64. Furthermore, a chuck 68A for front surface working and a chuck 68B for rear surface working are secured to the circular table 66 concentrically to the rotation axis and back to back.

Figure 3:
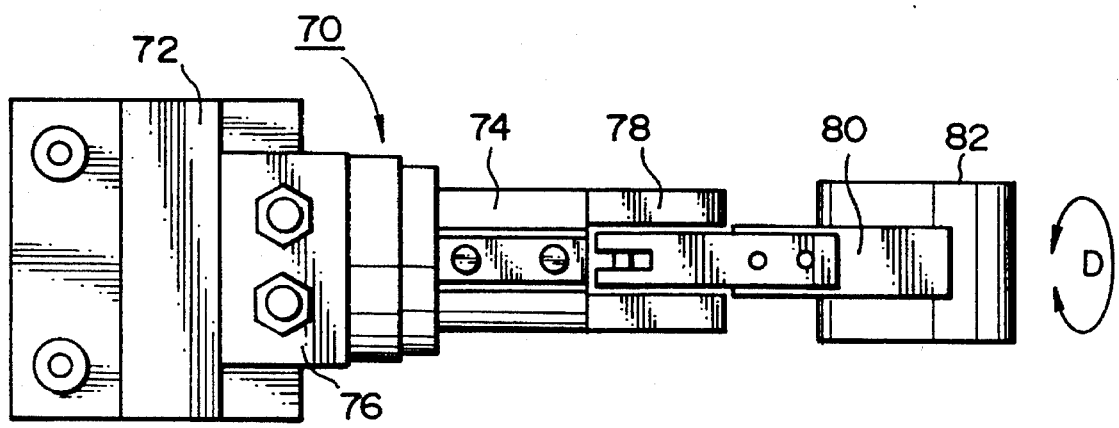
FIG. 3 is a top view showing the details of the reversing mechanism of the first embodiment.
Figure 3:
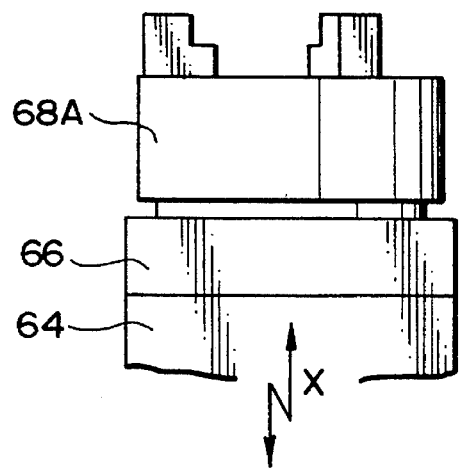
Figure 4:
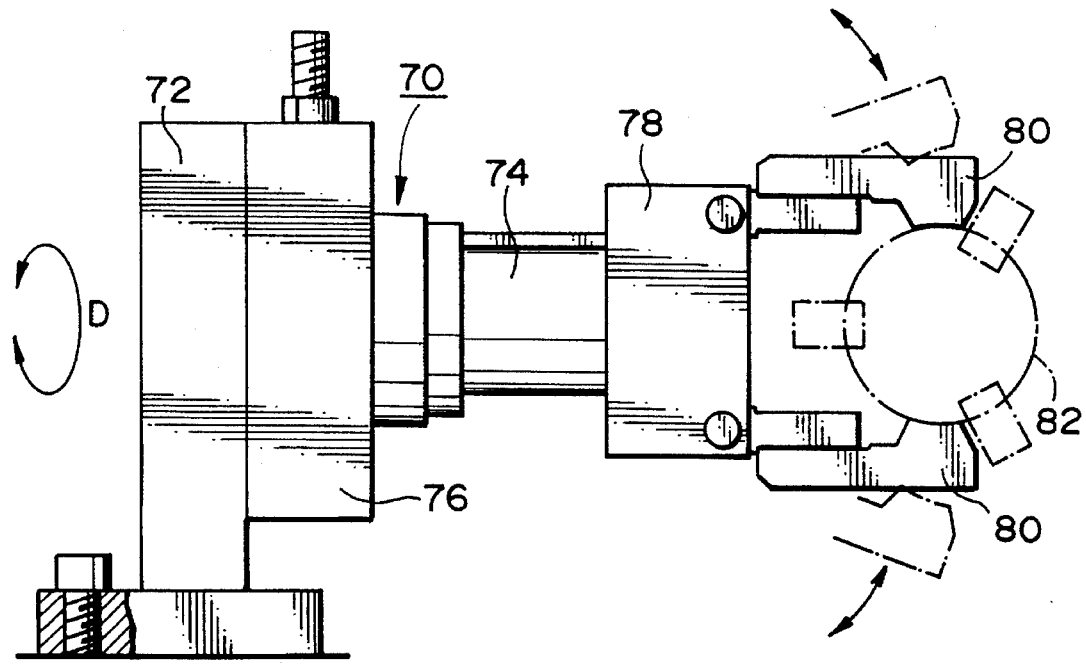
FIG. 4 is a front view showing the details of the reversing mechanism of the first embodiment.

A workpiece reversing mechanism 70 is set at the X-axis-directional moving end of the chuck base 64. FIGS. 3 and 4 show the details of the reversing mechanism 70. FIG. 3 is a top view of the mechanism and FIG. 4 is a front view of it.

The workpiece reversing mechanism 70, as shown in FIG. 3, is set so that an arm 74 can be rotated by 180° and indexed (D-axis rotation) by a rotary actuator 76 at the side of a stand 72 secured to the machine tool 50 and perpendicularly to the stand 72. A toggle-type hand 78 for holding a workpiece 82 is secured to the tip of the arm 74. Jaws 80 vertically operating are secured to the hand 78. The holding center of the jaws 80 is adjusted so that they are concentric with the chucks 68A and 68B when the rotation axis of the circular table 66 turns toward the X-axis. This machine tool is equipped with an NC device 86 for performing numerical control and an operation panel 84 for performing operations (See FIG. 2).

Next, functions of this embodiment will be described below.

Figure 5:
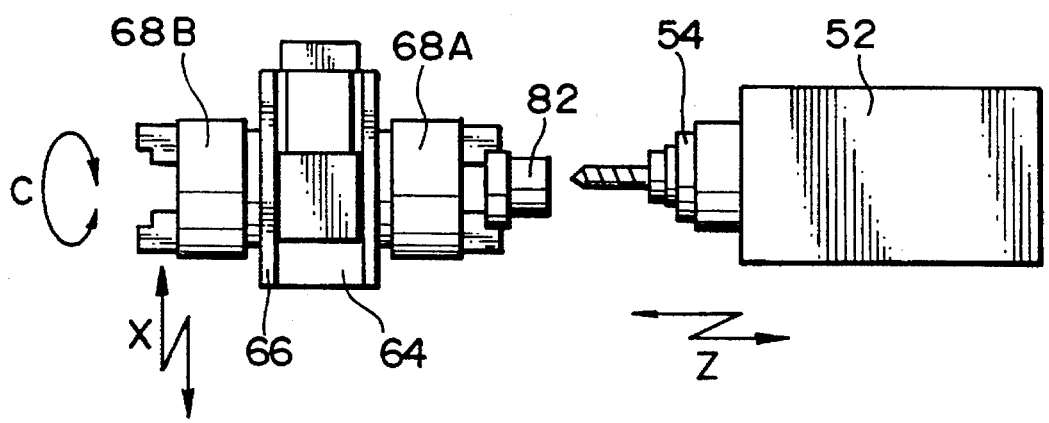
FIG. 5 is an illustration for explaining the operation when the machine tool of the first embodiment performs front surface working and rear surface working.

The chuck 64 is rotated and moved so that the rotation axis of the circular table 66 is set to the Z-axis direction and the workpiece 82 turns to the tool spindle head 54 when the workpiece 82 is held by the surface-working chuck 68A. The front of the workpiece 82 Is worked by positioning the X-axis of the chuck base 64, indexing the circular table 66 about the C axis, and feeding the tool spindle head 52 in the Z-axis direction (FIG. 5).

Figure 6:
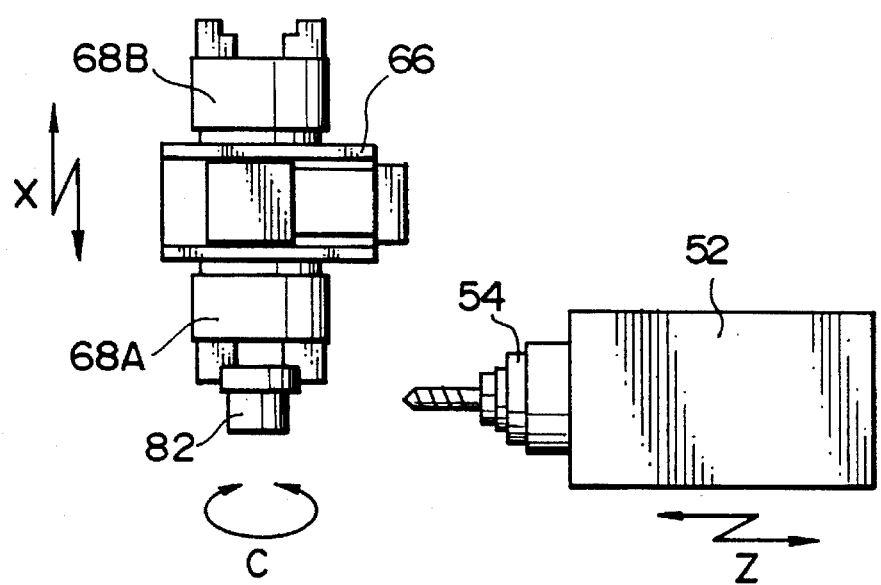
FIG. 6 is an illustration for explaining the operation when the machine tool of the first embodiment works the side surface of a workpiece.

Then, the side surface of the workpiece 82 is worked by indexing the chuck base 64 so that the rotation axis of the circular table 66 is set to the X-axis direction and the workpiece 82 turns toward the tool spindle 54 (FIG. 6).

Figure 7:
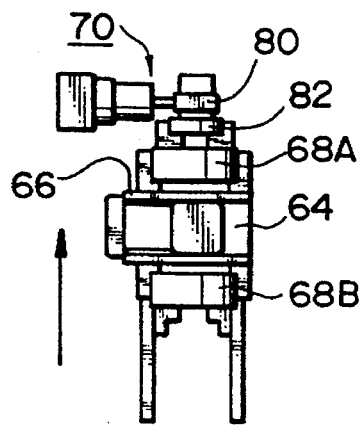
FIG. 7 is an illustration showing the delivery of a workpiece performed between the chuck and the reversing mechanism of the machine tool of the first embodiment.
Figure 8:
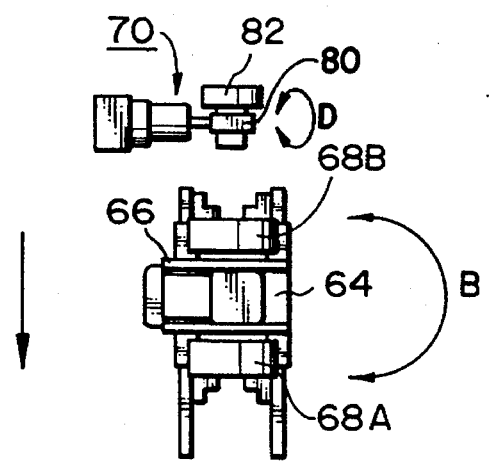
FIG. 8 is an illustration showing the delivery of a workpiece performed between the chuck and the reversing mechanism of the machine tool of the first embodiment.

When surface working of the front and the side of the workpiece 82 is completed, the chuck 64 is indexed so that the rotation axis of the circular table 66 is set to the X-axis direction and the workpiece 82 turns toward the reversing mechanism 70 and moreover, the workpiece 82 is inserted into the jaws 80 which are opened because of movement of the chuck base 64 toward the X-axis-directional reversing mechanism. Then, the jaws 80 close to hold the center of the workpiece 82 and the chuck 68A opens to deliver the workpiece 82 to the reversing mechanism 70 (FIG. 7). Then, the chuck base 64 slightly goes away from the X-axis-directional reversing mechanism 70 and separates from the workpiece 82. Thereafter, the chuck base 64 rotates up to 180° and the rear-working chuck 68B is indexed at the reversing mechanism 70 side. At the same time, the jaws 80 holding the workpiece 82 with the rotary actuator 76 rotates by 180° about the D axis (FIG. 8).

Figure 9:
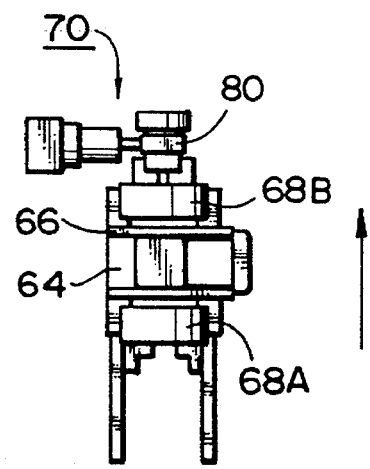
FIG. 9 is an illustration showing the delivery of a workpiece performed between tile chuck and the reversing mechanism of the machine tool of the first embodiment.

Then, the chuck base 64 moves toward the X-axis-directional reversing mechanism and the worked portion of the front surface of the workpiece 82 is inserted into the opened chuck pawls of the chuck 68B. Then, the chuck 68B closes and the jaws 80 open, and thus delivery of the workpiece 82 to the chuck 68B is completed (FIG. 9). Then, the chuck base 64 moves away from the reversing mechanism 70 and the rear-working chuck 68B is indexed at a working position facing the spindle head 54. Because the rear-working chuck 68B holds the worked portion of the surface, it has a shape which fits to the portion. Then, rear surface working is applied to the workpiece 82 whose surface has already been worked.

The above embodiments make It possible to continuously work the front surface and the rear surface of a workpiece. Moreover, because a tool for front surface working and rear surface working can be use in common, it is possible to prepare many types of tools and perform various types of working with the same machine tool.

What is claimed is:

1. A machine tool for continuously working the front surface and the rear surface of a workpiece, comprising:

a tool spindle which is supported so that it is able to approach to and move away from a workpiece and holds a cutting tool;

a chuck base on which first and second chucks for holding a workpiece are mounted concentrically and back to back and which is rotatable about a rotation axis perpendicular to the tool-spindle moving direction; and a reversing mechanism which receives a workpiece held by the first chuck, reverses the workpiece, returns the reversed workpiece to the second chuck having a shape fitted to the shape of a worked portion of the workpiece, and changes the portions of the workpiece facing the cutting tool.

2. The machine tool according to claim 1, wherein the chuck base is able to further slide in a lateral direction, said lateral direction being perpendicular to the spindle moving direction and to the chuck-base rotation axis.

3. The machine tool according to claim 1, wherein the reversing mechanism comprises:

a hand for holding a workpiece by the side;

an arm having the hand at its tip and a rotation axis in the direction perpendicular to the chuck-base moving direction; and a rotary actuator for rotating tile arm about the rotation axis and reversing the workpiece held by the hand.

4. The machine tool according to claim 1, further comprising:

a tool magazine for holding various types of tools; and a tool replacing mechanism for replacing a cutting tool held by the spindle with a cutting tool held by the tool magazine.

5. The machine tool according to claim 1, wherein the reversing mechanism is located adjacent the chuck base perpendicular to the spindle moving direction and to the chuck-base rotation axis.

* * * * *